(12) United States Patent
Constantine et al.

(10) Patent No.: US 10,415,454 B2
(45) Date of Patent: Sep. 17, 2019

(54) CONTROL SYSTEM FOR THERMAL MANAGEMENT OF AN ENGINE AFTERTREATMENT DEVICE

(71) Applicant: Perkins Engines Company Limited, Peterborough (GB)

(72) Inventors: Martin George Constantine, Leicester (GB); Ross Daniel Collins, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 48 days.

(21) Appl. No.: 15/793,002

(22) Filed: Oct. 25, 2017

(65) Prior Publication Data

US 2018/0135501 A1 May 17, 2018

(30) Foreign Application Priority Data

Nov. 15, 2016 (GB) .................................. 1619306.2

(51) Int. Cl.
| | |
|---|---|
| *F01P 7/02* | (2006.01) |
| *F01N 3/18* | (2006.01) |
| *F01N 3/20* | (2006.01) |
| *F01N 3/02* | (2006.01) |

(Continued)

(52) U.S. Cl.
CPC ................. *F01P 7/02* (2013.01); *F01N 3/02* (2013.01); *F01N 3/18* (2013.01); *F01N 3/2006* (2013.01); *F01P 5/043* (2013.01); *F01P 7/026* (2013.01); *F01N 2560/06* (2013.01); *F01N 2900/08* (2013.01); *F01N 2900/1602* (2013.01);

(Continued)

(58) Field of Classification Search
CPC ........ F01P 7/02; F01P 2001/005; F01P 5/043; F01P 7/026; F01P 2025/32; F01P 2025/46; F01N 3/18; F01N 2900/08; F01N 2560/06; F01N 2900/1602; F01N 3/2006; F01N 3/02; F01N 3/023-0296; F01N 9/002; F01N 2260/04; F01N 2430/00; Y02T 10/26
USPC ......... 60/272, 273, 274, 277, 285, 286, 289, 60/295, 296, 311, 320
See application file for complete search history.

(56) References Cited

U.S. PATENT DOCUMENTS

| | | | |
|---|---|---|---|
| 6,390,217 | B1 | 5/2002 | O'Brien et al. |
| 6,467,538 | B1 | 10/2002 | Acre et al. |
| 7,121,368 | B2 | 10/2006 | Mackelvie |

(Continued)

FOREIGN PATENT DOCUMENTS

| | | |
|---|---|---|
| JP | 2010-024858 A | 2/2010 |
| JP | 2012-157255 A | 8/2012 |

*Primary Examiner* — Mark A Laurenzi
*Assistant Examiner* — Mickey H France

(57) ABSTRACT

A control system is provided for thermal management of an aftertreatment device in an engine that is provided in an enclosure. The engine has a cooling fan that is operable in a first direction to cool said engine. The fan is also operable in a reverse direction opposite to the first direction. The control system includes a first temperature sensor that measures a temperature of the engine or the enclosure. The control system further includes a second temperature sensor that measures a temperature of the aftertreatment device. The control system also includes a processor that is coupled to the first and second temperature sensors. The processor is configured to issue control signals, based on whether regeneration is required by the aftertreatment device or not, for selectively controlling a direction of operation associated with the cooling fan.

17 Claims, 3 Drawing Sheets

(51) Int. Cl.
   *F01P 5/04* (2006.01)
   *F01P 1/00* (2006.01)

(52) U.S. Cl.
   CPC ..... *F01P 2001/005* (2013.01); *F01P 2025/32* (2013.01); *F01P 2025/46* (2013.01); *Y02T 10/26* (2013.01)

(56) References Cited

U.S. PATENT DOCUMENTS

| | | |
|---|---|---|
| 7,322,183 B2 | 1/2008 | Sisken et al. |
| 2004/0055283 A1 | 3/2004 | Iihoshi et al. |
| 2011/0072782 A1 | 3/2011 | Ozawa et al. |
| 2014/0109846 A1 | 4/2014 | Styles et al. |
| 2014/0120820 A1 | 5/2014 | Glugla et al. |
| 2014/0251239 A1 | 9/2014 | Richards et al. |
| 2016/0102597 A1 | 4/2016 | Jurzok et al. |

CONTROL SYSTEM FOR THERMAL MANAGEMENT OF AN ENGINE AFTERTREATMENT DEVICE

TECHNICAL FIELD

The present disclosure relates to a control system. More particularly, the present disclosure relates to a control system for thermal management of an aftertreatment device associated with an engine.

BACKGROUND

Exhaust aftertreatment systems are typically provided to internal combustion engines to reduce undesired emissions in the exhaust stream exiting the engine. For example, a selective catalytic reduction (SCR) system may be utilized to convert $NO_x$ emissions into nitrogen and water, other catalytic converters such as a diesel oxidation catalyst (DOC) converter may be utilized to reduce hydrocarbon and carbon monoxide emissions, whilst a diesel particulate filter (DPF) may be utilized to reduce particulate emissions such as soot.

Many aftertreatment systems have temperature requirements that must be met for the system to operate effectively and so reduce emissions exiting a vehicle. In addition, aftertreatment systems may have additional temperature requirements to perform a regeneration of the aftertreatment system. As a result, there is often a need to increase the temperature of the aftertreatment system to a temperature at which operation or regeneration of the aftertreatment system is possible.

U.S. Publication 2011/0072782 discloses lowering the speed of an engine cooling fan associated with the aftertreatment system so that a temperature of the aftertreatment system increases and regeneration commences sooner.

Most aftertreatment systems are of limited efficacy prior to reaching its required temperature. Thus, it would be desirable to further reduce the time before operation or regeneration of the aftertreatment system commences.

SUMMARY OF THE DISCLOSURE

In an aspect of present disclosure, a control system is provided for thermal management of an aftertreatment device in an engine. The engine is provided in an enclosure and has a cooling fan operable in a first direction to cool said engine. The fan is also operable in a reverse direction opposite to the first direction. The control system includes a first temperature sensor configured to measure a temperature of the engine or engine enclosure. The control system further includes a second temperature sensor that is configured to measure a temperature corresponding to the aftertreatment device. The control system also includes a processor communicably coupled to the first and second temperature sensors. The processor is configured to determine from the temperature measured by the second temperature sensor whether thermal management of the aftertreatment device is required, and if so generate a control signal to operate the cooling fan in the reverse direction. The processor is further configured to determine whether the temperature measured by the first temperature sensor exceeds a first predetermined temperature threshold and, if so, generate a control signal to operate the cooling fan according to an engine thermal management strategy. The processor then determines whether the temperature measured by the second temperature sensor exceeds a second predetermined temperature threshold and, if so, generate a control signal to commence regeneration by the aftertreatment device.

In another aspect of the present disclosure, a method is provided for thermal management of an aftertreatment device in an engine. The engine is provided in an enclosure and has a cooling fan operable in a first direction to cool said engine. The fan is also operable in a reverse direction opposite to the first direction. The method includes measuring a temperature of the engine or engine enclosure using a first temperature sensor, and measuring a temperature corresponding to the aftertreatment device using a second temperature sensor. The method further includes determining, using a processor, from the temperature measured by the second temperature sensor whether thermal management of the aftertreatment device is required. If so, the method further includes generating a control signal, using the processor, to operate the cooling fan in the reverse direction. The method further includes determining, using the processor, whether the temperature measured by the first temperature sensor exceeds a first predetermined temperature threshold. If so, the method further includes generating a control signal, using the processor, to operate the cooling fan according to an engine thermal management strategy. The method also includes determining, using the processor, whether the temperature measured by the second temperature sensor exceeds a second predetermined temperature threshold. If so, the method further includes generating a control signal, using the processor, to commence regeneration by the aftertreatment device.

Other features and aspects of this disclosure will be apparent from the following description and the accompanying drawings.

DETAILED DESCRIPTION

Figure 1:
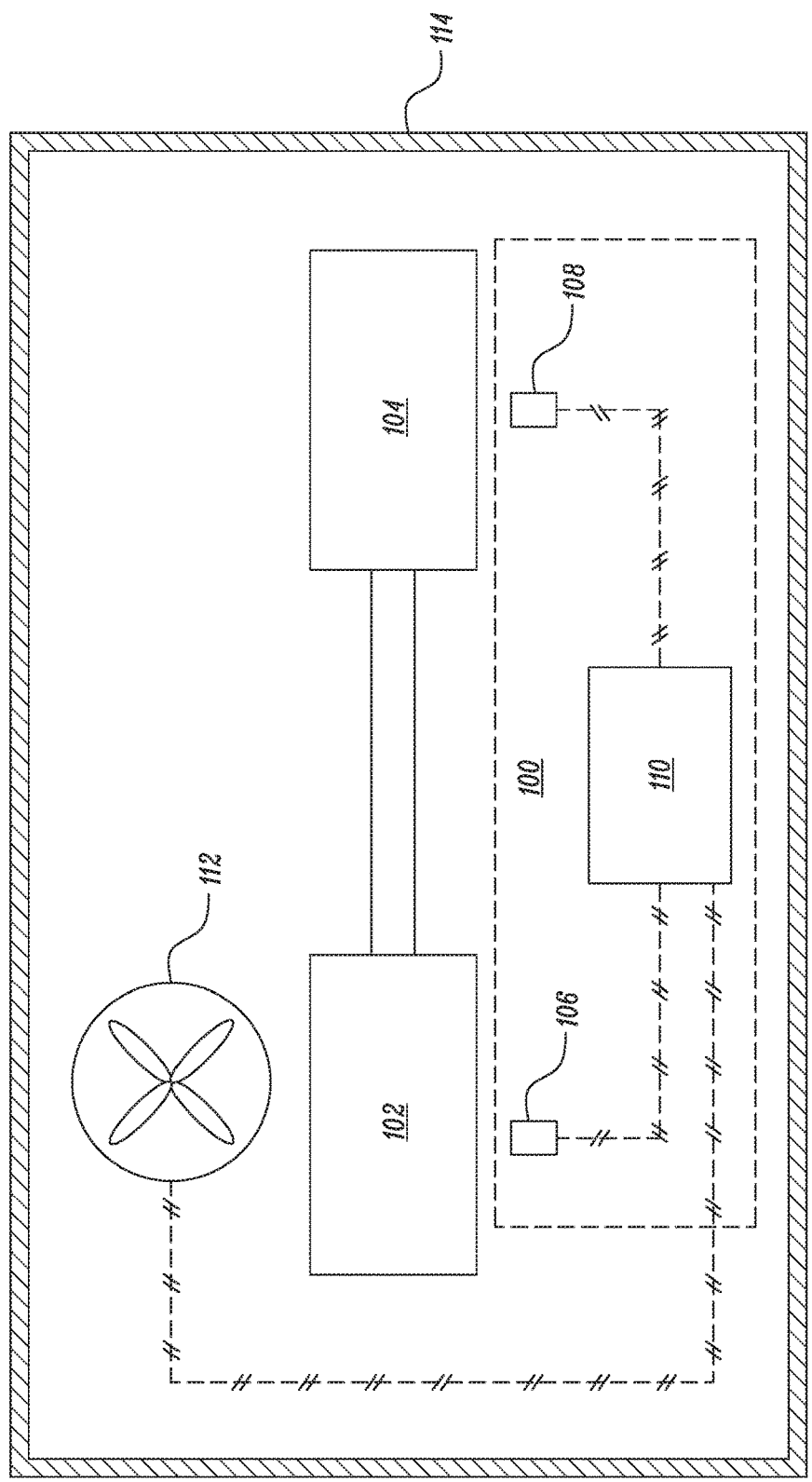
FIG. 1 is a schematic of an exemplary engine having an aftertreatment device and employing a system for performing thermal management of the aftertreatment device in accordance with embodiments of the present disclosure.

Throughout this description and in the drawings, like reference numbers will be used to refer to same or like parts.

FIG. 1 is a simplified schematic view of an engine 102. The engine 102 may be an internal combustion engine, such as, for example, a diesel engine, a gasoline engine, a gaseous fuel-powered engine (e.g., a natural gas engine), or any other type of combustion engine known to one skilled in the art.

As shown in FIG. 1, the engine 102 is provided in an enclosure 114 and has a cooling fan 112 operable in a first direction to cool the engine 102. The cooling fan 112 is also operable in a reverse direction opposite to the first direction. The engine 102 also has an aftertreatment device 104 disposed downstream of the engine 102 and fluidly coupled to an exhaust thereof. The aftertreatment device 104 is operable to reduce an amount of undesired emissions in the exhaust stream exiting the engine 102. In some arrangements, the engine 102 may include multiple aftertreatment devices. For instance, the engine 102 may include one or more of the following aftertreatment devices: an SCR device, a DPF, a DOC device. Other aftertreatment devices may also be used with the present disclosure.

The present disclosure relates to a control system 100 that is configured to perform thermal management of the aftertreatment device 104. As shown in FIG. 1, the control system 100 includes a first temperature sensor 106 that is configured to measure a temperature of the engine 102 or engine enclosure 114. In an embodiment of the disclosure, the first temperature sensor 106 may be configured to measure a temperature of an engine coolant. The control system 100 further includes a second temperature sensor 108 that is configured to measure a temperature corresponding to the aftertreatment device 104. In some embodiments, the second temperature sensor 108 may be configured to measure exhaust gas temperature to provide an indication of the temperature of the aftertreatment device 108, whilst in other embodiment the second temperature sensor 108 may be configured to measure the temperature of the aftertreatment device 104 directly. Throughout the remainder of this description it should be understood that references to measuring the temperature of the aftertreatment device 104 by the second temperature sensor 108 includes measurement of any temperature in the engine 102 suitable for providing an indication of the temperature of the aftertreatment device 104.

The control system 100 also includes a processor 110 that is communicably coupled to the first and second temperature sensors 106, 108. The processor 110 disclosed herein may embody a single microprocessor or multiple microprocessors that include components for performing functions consistent with the present disclosure. Numerous commercially available microprocessors can be configured to perform the functions of the processor 110 disclosed herein. It should be appreciated that the processor 110 could readily be embodied in a general purpose microprocessor capable of controlling numerous functions associated with the engine 102, the cooling fan 112, and the aftertreatment device 104. The processor 110 may also include a memory, a secondary storage device, and any other components for running an application. Various other circuits may be associated with the processor 110 such as power supply circuitry, signal conditioning circuitry for e.g., an analog-to-digital converter circuitry, and other types of circuitry. Various routines, algorithms, and/or programs can be programmed within the processor 110 for execution thereof. Moreover, it should be noted that the processor 110 of the present disclosure may be a stand-alone processor or may be configured to co-operate with an existing processor/s (not shown) provided to the engine 102, for example, an electronic control module (ECM) to perform functions that are consistent with the present disclosure.

With continued reference to FIG. 1, the processor 110 is configured to determine whether thermal management of the aftertreatment device 104 is required. If thermal management is required the processor 110 is configured to generate a control signal to operate the cooling fan 112 in the reverse direction. It is hereby contemplated that operating the cooling fan 112 in the reverse direction serves to decrease the local passive cooling of engine 102 and aftertreatment device 104 leading to reduced temperature loss; operating the cooling fan 112 in the reverse direction may heat the engine 102 and engine enclosure 114, such as by drawing ambient air across a heat exchanger such as a radiator and into the engine enclosure 114. Further, operating the cooling fan 112 in the reverse direction also places a parasitic load on the engine 102.

Additionally or optionally, the control signal generated by the processor 110 to operate the cooling fan 112 in the reverse direction may be configured to increase the rotation speed of the cooling fan 112. Further, the increase in the rotation speed of the cooling fan 112 may be commensurate with a maximum speed of the cooling fan 112. It is hereby envisioned that by increasing the speed of the cooling fan 112 in the reverse direction, a parasitic load on the engine 102 can be increased to increase a temperature of the exhaust stream exiting the engine 102 which in turn can help to bring about an increase in the temperature of the aftertreatment device 104. In other embodiments, the processor 110 may be configured to generate a control signal to activate other systems to further increase the parasitic load on the engine 102. Such systems may include headlights, recharging batteries or other energy storage units in hybrid vehicles, and other systems that would be apparent to the skilled addressee. Reversing the direction of the cooling fan 112 provides a dual benefit, however, by both providing a parasitic load while also helping to increase the temperature of the engine enclosure 114 and engine 102 as described above.

In some embodiments of the disclosure, the cooling fan 112 may be an electric/hydraulic demand fan having an 'off' state. Thermal management of the aftertreatment device 104 is likely to be prevalent in colder ambient conditions and/or when the engine 102 is under lower load conditions. Naturally this would lead to colder engine temperatures and so in normal operation the cooling fan 112 may be turned off. In such conditions, the engine 102's parasitic load could be increased by turning on the cooling fan 112 in a reverse direction from a previous 'off' state. It will be appreciated from the above that the present disclosure may also be used with reversible demand fans that do not have a variable speed control but rather have on and off states.

The processor 110 is also configured to determine whether the temperature measured by the second temperature sensor 108 exceeds a second predetermined temperature threshold. If so, the processor 110 generates a control signal to commence aftertreatment by the aftertreatment device 104. It may be noted that the second predetermined temperature threshold disclosed herein is commensurate with a temperature at which the aftertreatment device 104 can operate effectively. It will be understood by those skilled in the art that the aftertreatment device 104 may require one temperature to effectively operate to reduce emissions and another temperature to effectively regenerate. The processor 110 may be configured to have a second predetermined temperature threshold according to whether thermal management of the aftertreatment device 104 is required to operate to reduce emissions or to regenerate.

Additionally, while the cooling fan 112 is operating in the reverse direction, the processor 110 is configured to determine whether the temperature of the engine 102 or the engine enclosure 114 as measured by the first temperature sensor 106 exceeds a first predetermined temperature threshold. It may be noted that the first predetermined temperature threshold disclosed herein is commensurate with a maximum operating temperature of the engine 102 or the engine enclosure 114. If the processor 110 determines that the temperature measured by the first temperature sensor 106 has exceeded the first predetermined temperature threshold, then the processor 110 subsequently generates a control signal to operate the cooling fan 112 according to an engine thermal management strategy. In embodiments of this disclosure, the control signal generated by the processor 110 to operate the cooling fan 112 according to the engine thermal management strategy includes generating a control signal for directing the cooling fan 112 to operate in the first direction so that the engine 102 may be cooled down.

Also, when the cooling fan 112 is operating in the reverse direction, the processor 110 also determines from the temperature measured by the second temperature sensor 108 whether the temperature of the aftertreatment device 104 is increasing. Despite rotating the cooling fan 112 in the reverse direction, if the processor 110 determines from the second temperature sensor 108 that the temperature of the aftertreatment device 104 is not increasing, then the processor 110 is configured to generate a control signal for operating the cooling fan 112 according to the engine thermal management strategy in which the cooling fan 112 is directed to operate in the first direction so that the engine 102 may be cooled down.

Therefore, in embodiments of this disclosure, when the cooling fan 112 is operating in the reverse direction, the processor 110 is configured to revert the operation of the cooling fan 112 from its current reverse direction into operating the cooling fan 112 according to the engine thermal management strategy, i.e. its first direction, in the event that the temperature of the aftertreatment device 104 does not increase despite operating the cooling fan 112 in the reverse direction or if the temperature of the engine 102 as measured by the first temperature sensor 106 exceeds the first predetermined temperature threshold.

In an embodiment, the processor 110 is also configured to wait for a predetermined time period, after generating a control signal to operate the cooling fan 112 according to the engine thermal management strategy, prior to again determining whether thermal management of the aftertreatment device 104 is required. The predetermined time period disclosed herein may range from a few milliseconds to a few minutes.

In an example, after generating a control signal to operate the cooling fan 112 according to the engine thermal management strategy, the processor 110 may wait for a predetermined time period of thirty seconds before determining again from the temperature measured by the second temperature sensor 108 whether thermal management of the aftertreatment device 104 is required or not.

In another example, the processor 110 may wait for a predetermined time period of twenty minutes before determining again from the temperature measured by the second temperature sensor 108 whether thermal management of the aftertreatment device 104 is required. It may be noted that the foregoing examples provided in conjunction with the predetermined time period is non-limiting of this disclosure. Rather, the predetermined time period varies from one application to another depending on specific requirements of an application.

In another embodiment, the processor 110 may be configured to generate the control signal to operate the cooling fan 112 according to the engine thermal management strategy after generating the control signal to commence aftertreatment by the aftertreatment device 104. In this embodiment, the predetermined period of time for which the processor 110 would otherwise wait is altogether omitted. It is contemplated that in some cases, the processor 110 may determine that engine thermal management strategy may be required on the engine 102 soon after an increase in the temperature of the aftertreatment device 104 has been brought about or soon after the aftertreatment device 104 has reached its generation region. This manner of operation for the cooling fan 112 may be advantageously executed by the processor 110 when the processor 110 determines that the temperature of the engine 102 as measured by the first temperature sensor 106 has already reached its first temperature threshold while the cooling fan 112 was being operated earlier in the reverse direction to bring about an increase in the temperature of the aftertreatment device 104.

Therefore, in embodiments of this disclosure, it has been contemplated that the processor 110 could revert the operation of the cooling fan 112 from its current reverse direction to its first direction when the temperature of the engine 102 as measured by the first temperature sensor 106 reaches the first predetermined temperature threshold without regard to whether the temperature of the aftertreatment device 104 has reached the second predetermined temperature threshold so that an overheating of the engine 102 may be prevented.

In other embodiments of this disclosure, it is contemplated that the processor 110 could revert the operation of the cooling fan 112 from its current reverse direction to its first direction according to other criteria such as maintaining the temperature of the aftertreatment device 104, as measured by the second temperature sensor 108, above a temperature threshold for a debounce time period or after regeneration is completed successfully. Criteria for determining successful regeneration may include estimations diesel particulate filter (DPF) soot load reducing to a threshold level. Yet further alternative criteria in other embodiments may include NOx conversion efficiency of an SCR system reaching a predetermined target level. It is contemplated that in some embodiments of this disclosure the processor 110 could revert the operation of the cooling fan 112 from its current reverse direction to its first direction according to a first of several of the above criteria being satisfied, according to the application requirements. In some embodiments, the processor 110 may receive state information regarding the aftertreatment device 104 from an engine control unit (ECU).

In embodiments of this disclosure, it is contemplated that the predetermined time period implemented by the processor 110 may also account for the amount of time required by the cooling fan 112, if currently operating in its reverse direction, to come to a halt before beginning to rotate in the first direction. Similarly, when the cooling fan 112 is required to change its direction of operation from the first direction to the reverse direction e.g., when thermal thermal management of the aftertreatment device 104 is required, the processor 110 is configured to provide an amount of time that is commensurate with a current speed of the cooling fan 112 so that the cooling fan 112 has sufficient amount of time to come to a still momentarily before the cooling fan 112 begins to operate in the reverse direction.

Figure 2:
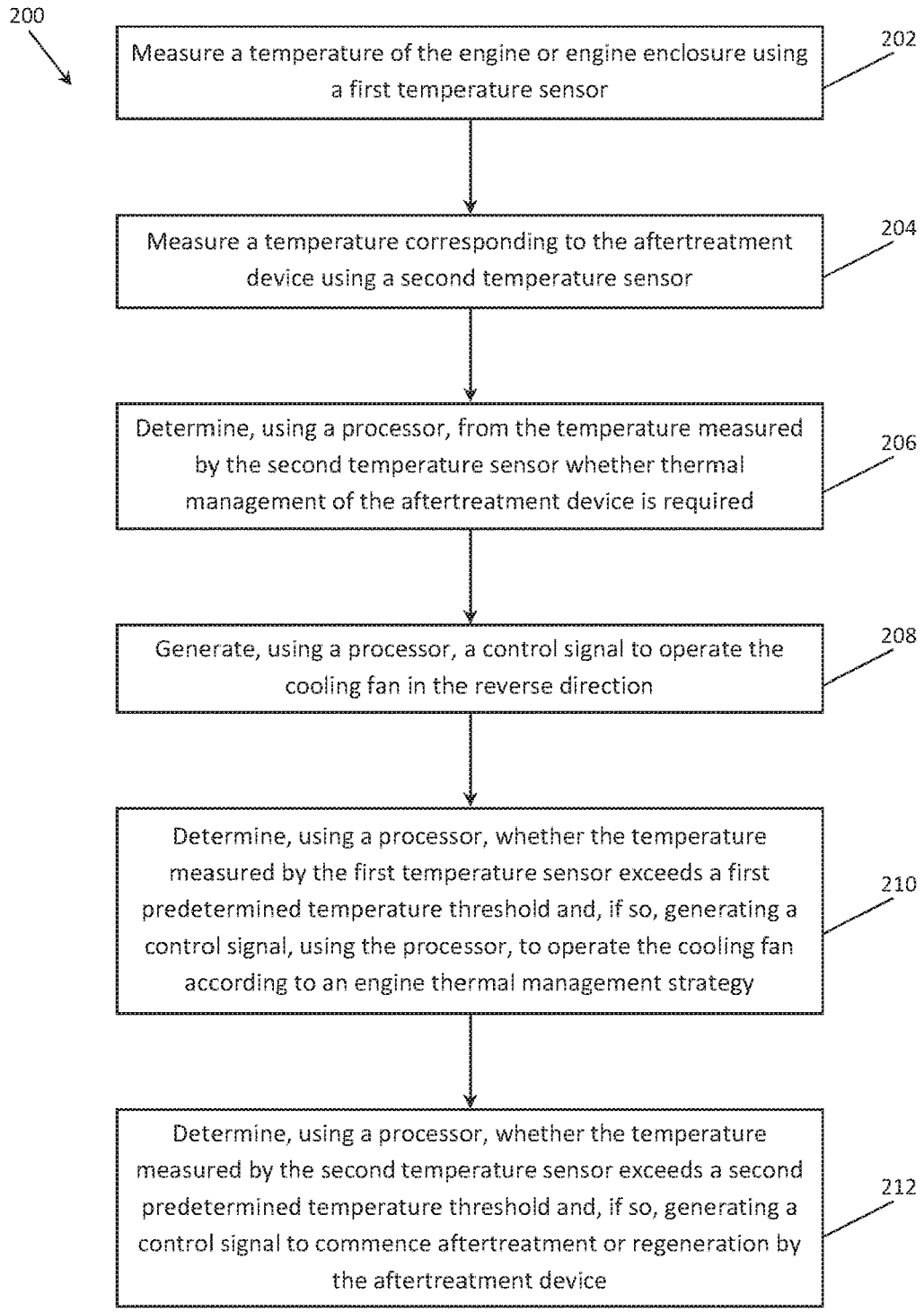
FIG. 2 is a flowchart of a method for performing thermal management of the aftertreatment device, in accordance with embodiments of the present disclosure.

FIG. 2 illustrates a flowchart of a method 200 for performing thermal management of the aftertreatment device 104, in accordance with embodiments of the present disclosure.

Referring to FIG. 2, at step 202, the method 200 includes measuring a temperature of the engine 102 or engine enclosure 114 using the first temperature sensor 106. At step 204, the method 200 further includes measuring the temperature corresponding to the aftertreatment device 104 using the second temperature sensor 108. At step 206, the method 200 includes determining, using the processor 110 whether thermal management of the aftertreatment device 104 is required. As will be described in more detail below, this determination may be made according to whether the aftertreatment device 104 will be operated to perform aftertreatment or to perform regeneration. If so, at step 208, the method 200 includes generating a control signal, using the processor 110, to operate the cooling fan 112 in the reverse direction.

Further, at step 210, the method 200 includes determining, using the processor 110, whether the engine temperature, as measured by the first temperature sensor 106, exceeds a first predetermined temperature threshold. If so, at step 212, the method 200 further includes generating a control signal, using the processor 110, to operate the cooling fan 112 according to an engine thermal management strategy, i.e. to operate the cooling fan 112 in its first direction.

Furthermore, at step 212, the method 200 also includes determining, using the processor 110, a state of the aftertreatment device indicates that the aftertreatment device may be operated successfully. In one embodiment of the method, this determination may be made by determining whether the temperature measured by the second temperature sensor 108 exceeds a second predetermined temperature threshold. If a state of the aftertreatment device indicates that the aftertreatment device may be operated successfully so, the method 200 further includes generating a control signal, using the processor 110, to commence aftertreatment or regeneration by the aftertreatment device 104.

Figure 3:
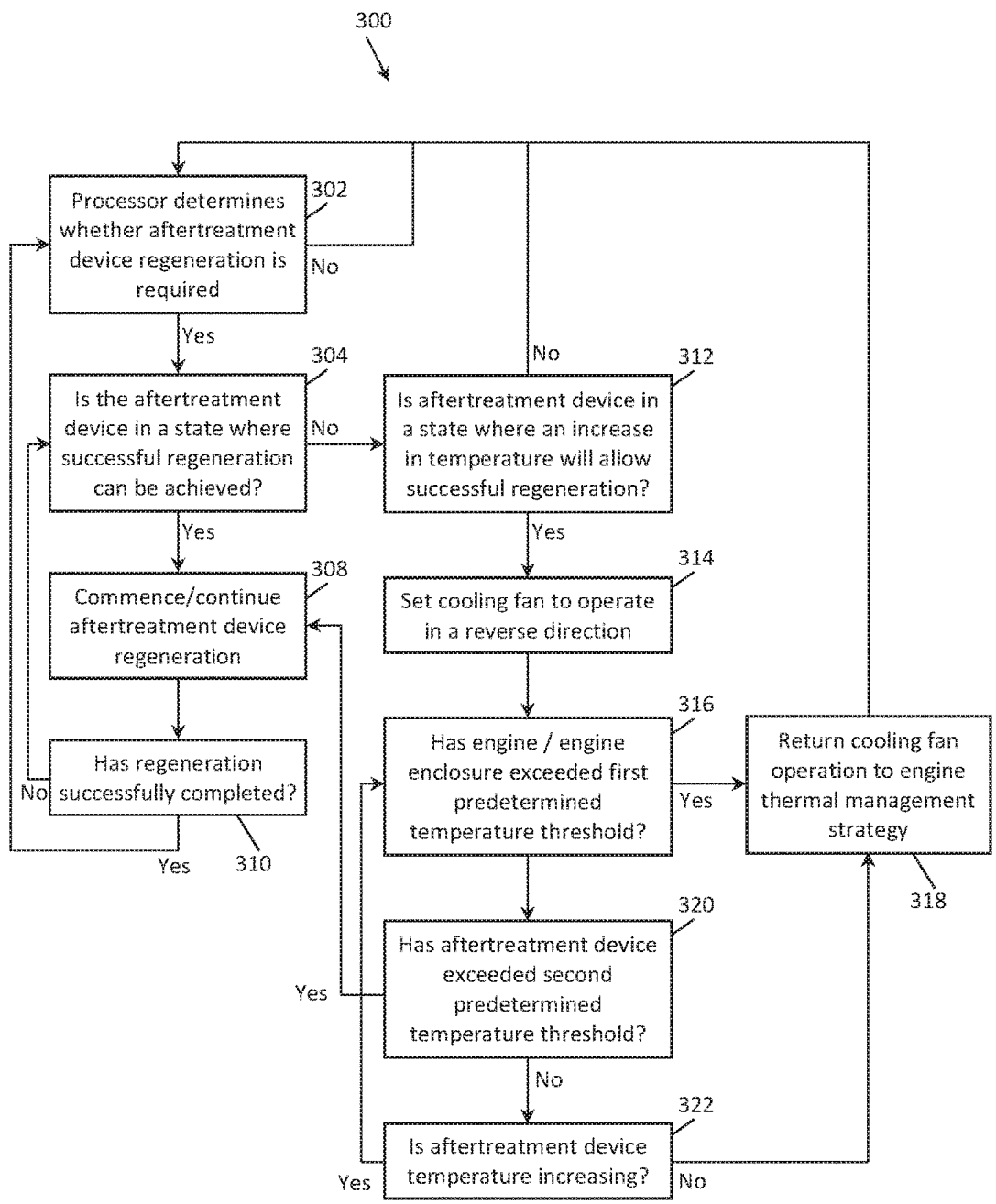
FIG. 3 is a low-level implementation of a process for performing thermal management of the aftertreatment device pursuant to the method of FIG. 2, in accordance with an exemplary embodiment of the present disclosure.

FIG. 3 illustrates an example flowchart of a process 300 for performing thermal management of the aftertreatment device 104 pursuant to the method 200 of FIG. 2, in accordance with embodiments of the present disclosure. For clarity, the process 300 will be described with reference to thermal management for the purposes of performing a regeneration of an aftertreatment device. It will be appreciated by those skilled in the art that the thermal management describe herein may be used in other applications, such as to increase the temperature of the aftertreatment device to operating temperature to perform aftertreatment.

The process 300 initiates at step 302 where the processor 110 determines whether regeneration of the aftertreatment device 104 is required. The requirement for regeneration of the aftertreatment device 104 may be based on a condition of the aftertreatment device 104. As previously described, the processor 110 may receive status information regarding the aftertreatment device 104 from an engine control unit (ECU) or may receive status signals from the aftertreatment device 104. In one embodiment of the disclosure, requirement for regeneration of the aftertreatment device 104 may be determined by the processor 110 according to one or more of the following according to the type of aftertreatment device: whether a DPF soot filter has reached its capacity limit; catalyst regeneration being required due to sulphur poisoning and/or deactivation; the formation of diesel exhaust fluid (DEF) urea deposits being detected by a suitable sensor; SCR conversion efficiency has dropped below a threshold level. In other embodiments of the disclosure, the processor 110 may determine whether regeneration of the aftertreatment device 104 is required according to other criteria relevant to the aftertreatment device 104 being used.

If the processor 110 determines regeneration of the aftertreatment device 104 is required, then at step 304, the processor 110 determines from the temperature measured by the second temperature sensor 108 whether the aftertreatment device 104 is in a region where successful regeneration can be performed. It may be noted that the processor 110 may execute this step 304 of the process 300 at an instant of time when the temperature of the aftertreatment device 104 is increasing but has not yet reached the second predetermined temperature threshold.

If at step 304, the processor 110 determines that the aftertreatment device 104 is in a region where successful regeneration can be achieved, then the process 300 proceeds to step 308, where the processor 110 generates a control signal to initiate or continue regeneration of the aftertreatment device 104.

The process 300 then proceeds to step 310 in which the processor 110 determines whether regeneration of the aftertreatment device 104 has been completed. This step 310 may be carried out by the processor 110 by comparing status information regarding the aftertreatment device 104 against target criteria for the regeneration being performed according to the type of aftertreatment device. For instance, DPF soot load reducing to a target level, NOx conversion efficiency of an SCR system reaching a target level, DEF urea deposit levels reduced below a target level, and so on.

If at step 310, the processor 110 determines that regeneration of the aftertreatment device 104 has been completed, the processor 110 is configured to issue a control signal for operating the cooling fan 112 according to the engine thermal management strategy i.e., whereby the cooling fan 112 is configured to operate in its first direction for cooling the engine 102. The process 300 then returns to step 302. If not, the process 300 returns to step 304 where the processor 110 repeats steps 304 through 310.

If the processor 110, at step 304, determines that the aftertreatment device 104 is not in a region where successful regeneration can be achieved, then the process 300 proceeds to step 312.

At step 312 of the process 300, the processor 110 is further configured to determine if the aftertreatment device 104 is in a state where thermal management, to increase the temperature of the aftertreatment device 104, would allow successful regeneration of the aftertreatment device 104. If so, the process 300 proceeds to step 314, described below. Where the temperature of the aftertreatment device 104 is determined to be too high to allow successful regeneration of the aftertreatment device 104, or sufficiently high that commencing regeneration may risk adverse effect such as exotherm reactions in DPF filters, the process 300 returns to step 302.

If the processor 110 determines that thermal management would allow successful regeneration of the aftertreatment device 104 at step 312, then the process 300 continues at step 314 in which the processor 110 issues control signals to operate the cooling fan 112 in the reverse direction; otherwise the process 300 returns to step 302. As previously disclosed earlier herein, additionally or optionally, the control signal issued by the processor 110 at step 314 may also be configured to increase the rotational speed of the cooling fan 112 so that a parasitic load on the engine 102 may be increased.

Thereafter, the process 300 proceeds to step 316, at which the processor 110 is configured to determine if a temperature of the engine 102 or that of the engine enclosure 114, as measured by the first temperature sensor 106, has reached the first predetermined temperature threshold. If the processor 110 determines that the temperature of the engine 102 has not yet reached the first predetermined temperature threshold, the process 300 proceeds to step 320, otherwise the process 300 proceeds to step 318.

At step 320, the processor 110 is configured to determine from the temperature measured by the second temperature sensor 108 whether the aftertreatment device 104 has reached its regeneration region. If the processor 110 determines that the aftertreatment device 104 has not yet reached its regeneration region, then the process 300 proceeds to step 322, described below. Alternatively, if the processor 110 determines that the aftertreatment device 104 has reached its regeneration region the process 300 proceeds to step 308 to commence or continue regenerating the aftertreatment device 104 as described above.

At step 322 the processor 110 determines from the second temperature sensor 108 if the temperature associated with the aftertreatment device 104 is at least increasing over time. If so, the process 300 returns to step 316 above. If not, the process 300 proceeds from step 322 to step 318.

At step 318, which may be arrived at via steps 316 or 322, the processor 110 is configured to issue a control signal for operating the cooling fan 112 according to the engine thermal management strategy i.e., whereby the cooling fan 112 operates in its first direction for cooling the engine 102. The process 300 then returns to step 302. The processor 110 may be configured in some embodiments of the present disclosure to wait a predetermined time period before again determining at step 302 whether thermal management of the aftertreatment device 104 is required. The predetermined time period disclosed herein may be any suitable time period, such as between 15-60 seconds and more preferably 30 seconds.

In embodiments of the present disclosure, the processor 110 may be implemented using one or more physical computers, embedded devices, field programmable gate arrays (FPGAs), microcontrollers, or computer systems or portions thereof. The instructions executed by the processor 110 may also be read in from a computer-readable medium. The computer-readable medium may be non-transitory, such as a CD, DVD, optical or magnetic disk, laserdisc, flash memory, embedded memory within the processor 110 or any other medium that is readable by the processor 110. In some embodiments, hardwired circuitry may be used in place of or in combination with software instructions executed by the processor 110. Communication among modules, systems, devices, and elements may be over direct or switched connections, and wired or wireless networks or connections, via directly connected wires, or any other appropriate communication mechanism. Transmission of information may be performed on a hardware layer using any appropriate system, device, or protocol, including those related to or utilizing Firewire, PCI, PCI express, CardBus, USB, CAN, SCSI, IDA, RS232, RS422, RS485, 802.11, etc. The communication among modules, systems, devices, and elements forming the processor 110 of the present disclosure may include handshaking, notifications, coordination, encapsulation, encryption, headers, such as routing or error detecting headers, or any other appropriate communication protocol or attribute. Communication may also include messages related to HTTP, HTTPS, FTP, TCP, IP, ebMS OASIS/ebXML, DICOM, DICOS, secure sockets, VPN, encrypted or unencrypted pipes, MIME, SMTP, MIME Multipart/Related Content-type, SQL, etc.

Various embodiments disclosed herein are to be taken in the illustrative and explanatory sense, and should in no way be construed as limiting of the present disclosure. All joinder references (e.g., associated, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements, embodiments, variations and/ or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The disclosure sets forth a control system. More particularly, the present disclosure is directed to a control system for performing thermal management of an aftertreatment device that is associated with an engine.

With use of embodiments disclosed herein, a temperature of an aftertreatment device 104 can be regulated to improve performance of the aftertreatment device 104. Particularly, with use of embodiments disclosed herein, a temperature of the aftertreatment device 104 can be maintained so as to render the aftertreatment device 104 in its regeneration region for a maximum period of time and hence, facilitate the aftertreatment device 104 in effectively reducing undesired emissions in the exhaust stream exiting the engine 102.

Many previously known thermal management strategies for an aftertreatment device merely involve increasing or decreasing a rotational speed of a cooling fan to alter performance characteristics of the aftertreatment device. By merely changing a speed of the cooling fan, it is envisioned that the aftertreatment device may take a longer period of time to reach its regeneration state as compared to the present disclosure, in which embodiments described herein operate the cooling fan 112 in a reverse direction.

While aspects of the present disclosure have been particularly shown and described with reference to the embodiments above, it will be understood by those skilled in the art that various additional embodiments may be contemplated by the modification of the disclosed systems, methods and processes without departing from the spirit and scope of what is disclosed. Such embodiments should be understood to fall within the scope of the present disclosure as determined based upon the claims and any equivalents thereof.

What is claimed is:

1. A control system for thermal management of an aftertreatment device in an engine, the engine being provided in an enclosure and having a cooling fan operable in a first direction to cool said engine and also being operable in a reverse direction opposite to the first direction, the control system comprising:
  a first temperature sensor configured to measure a temperature of the engine or the enclosure;
  a second temperature sensor configured to measure a temperature corresponding to the aftertreatment device;
  a processor configured to perform method steps of:
    determining from a temperature measured by the second temperature sensor whether thermal management of the aftertreatment device is required, and if so:

generating a control signal to operate the cooling fan in the reverse direction;

determining whether a temperature measured by the first temperature sensor exceeds a first predetermined temperature threshold and, if so, generating a control signal, using the processor, to operate the cooling fan according to an engine thermal management strategy; and determining whether the temperature measured by the second temperature sensor exceeds a second predetermined temperature threshold and, if so, generating a control signal to commence regeneration by the aftertreatment device; and determining from the temperature measured by the second temperature sensor whether the temperature of the aftertreatment device is increasing, and if not, generating a control signal to operate the cooling fan according to the engine thermal management strategy.

2. The control system of claim 1, wherein the control signal generated by the processor to operate the cooling fan in the reverse direction is configured to increase a rotation speed of the cooling fan.

3. The control system of claim 2, wherein the control signal generated by the processor to operate the cooling fan in the reverse direction is configured to increase the rotation speed of the cooling fan commensurate with a maximum speed of the cooling fan.

4. The control system of claim 1, wherein the control signal generated by the processor to operate the cooling fan according to the engine thermal management strategy comprises generating a control signal to operate the cooling fan in the first direction.

5. The control system of claim 1, wherein the processor is configured to perform the further method step of: waiting for a predetermined time period, after generating a control signal to operate the cooling fan according to the engine thermal management strategy, prior to again determining from the temperature measured by the second temperature sensor whether thermal management of the aftertreatment device is required.

6. The control system of claim 1, wherein the processor is configured to perform the further method step of: generating the control signal to operate the cooling fan according to the engine thermal management strategy after generating the control signal to commence regeneration by the aftertreatment device.

7. The control system of claim 1, wherein the first predetermined temperature threshold is commensurate with a maximum operating temperature of the engine or the enclosure.

8. The control system of claim 1, wherein the second predetermined temperature threshold is commensurate with a temperature at which the aftertreatment device has reached a regeneration region.

9. A method for thermal management of an aftertreatment device in an engine, the engine being provided in an enclosure and having a cooling fan operable in a first direction to cool said engine and also being operable in a reverse direction opposite to the first direction, the method comprising:

measuring a temperature of the engine or the enclosure using a first temperature sensor;

measuring a temperature corresponding to the aftertreatment device using a second temperature sensor;

determining, using a processor, from a temperature measured by the second temperature sensor whether thermal management of the aftertreatment device is required, and if so:

generating a control signal, using the processor, to operate the cooling fan in the reverse direction;

determining, using the processor, whether a temperature measured by the first temperature sensor exceeds a first predetermined temperature threshold and, if so, generating a control signal, using the processor, to operate the cooling fan according to an engine thermal management strategy; and determining, using the processor, whether the temperature measured by the second temperature sensor exceeds a second predetermined temperature threshold and, if so, generating a control signal, using the processor, to commence regeneration by the aftertreatment device; and determining, using the processor, from the temperature measured by the second temperature sensor whether the temperature of the aftertreatment device is increasing, and if not, generating a control signal to operate the cooling fan according to the engine thermal management strategy.

10. The method of claim 9, wherein the control signal generated by the processor to operate the cooling fan in the reverse direction is configured to increase a rotation speed of the cooling fan.

11. The method of claim 10, wherein the control signal generated by the processor to operate the cooling fan in the reverse direction is configured to increase the rotation speed of the cooling fan commensurate with a maximum speed of the cooling fan.

12. The method of claim 9, wherein the control signal generated by the processor to operate the cooling fan according to the engine thermal management strategy comprises generating a control signal to operate the cooling fan in the first direction.

13. The method of claim 9, further comprising waiting, by the processor, for a predetermined time period prior to again determining from the temperature measured by the second temperature sensor whether thermal management of the aftertreatment device is required after generating a control signal to operate the cooling fan according to the engine thermal management strategy.

14. The method of claim 9, further comprising generating the control signal, using the processor, to operate the cooling fan according to the engine thermal management strategy after generating the control signal to commence regeneration by the aftertreatment device.

15. The method of claim 9, wherein the first predetermined temperature threshold is commensurate with a maximum operating temperature of the engine or the enclosure.

16. The method of claim 9, wherein the second predetermined temperature threshold is commensurate with a temperature at which the aftertreatment device has reached a generation region.

17. A non-transient computer-readable medium containing program instructions for causing a processor to perform the method of claim 9.

* * * * *